June 17, 1969     W. BLUME     3,450,907
MINIATURIZED ELECTRICAL MACHINE CONSTRUCTION
Filed Dec. 18, 1967
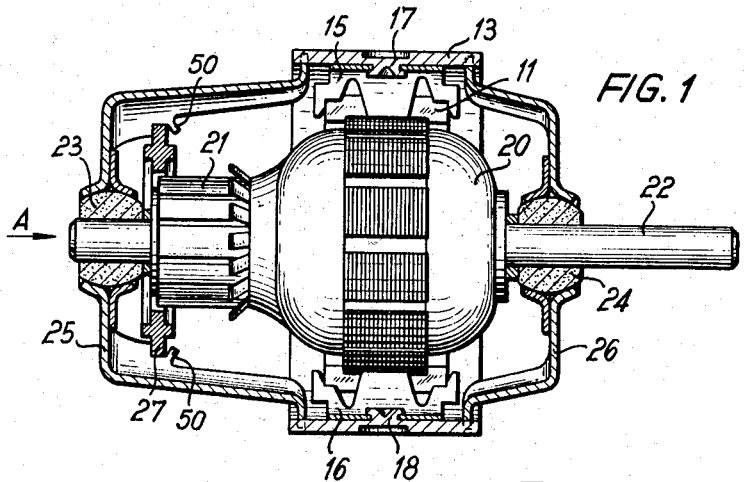
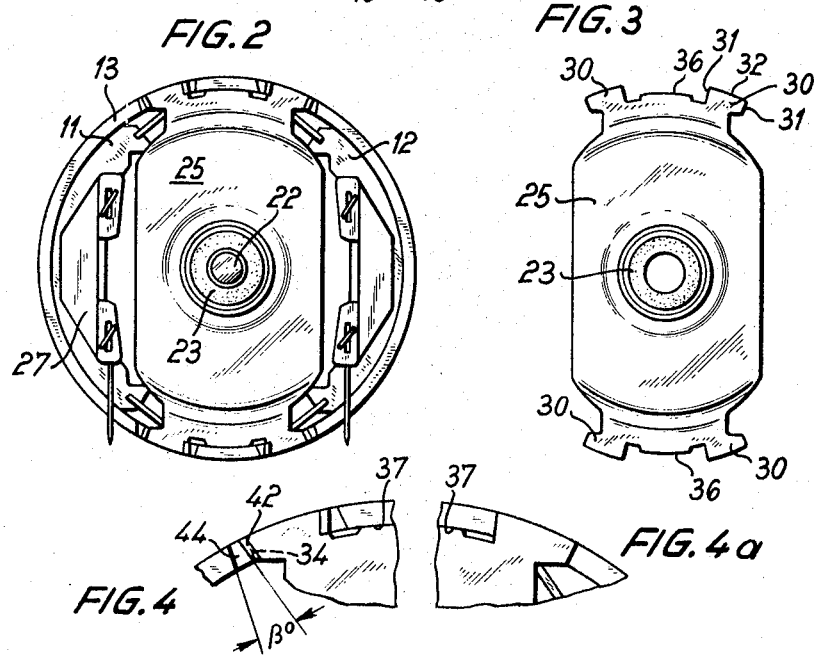
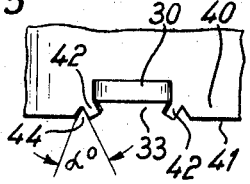
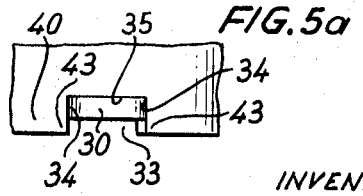
INVENTOR:
Willi BLUME
By
his ATTORNEY

United States Patent Office 3,450,907
Patented June 17, 1969

3,450,907
MINIATURIZED ELECTRICAL MACHINE CONSTRUCTION
Willi Blume, Buhlertal, Germany, assignor to Robert Bosch G.m.b.H., Stuttgart, Germany
Filed Dec. 18, 1967, Ser. No. 691,356
Claims priority, application Germany, Dec. 17, 1966, B 90,367
Int. Cl. H02k 15/00
U.S. Cl. 310—42         7 Claims

ABSTRACT OF THE DISCLOSURE

An assembly construction of an electrical machine having a stator and a rotor. The housing section has a planar wall section extending radially outward. This wall section rests upon the frontal side of the stator. The latter has axial projections forming shoulder surfaces between which the planar wall section extends. These projections on the stator serve to centrally locate and secure the housing section. The height of the projections on the stator are larger than the thickness of the planar wall section, when taken in the direction of the rotor axis. The projections also have retaining lugs between the frontal side of the stator and the shoulder surfaces. These lugs are chiseled from the frontal side and formed from a groove-shaped cut so as to extend beyond the rim of the housing section. In one embodiment the housing section is U-shaped and contains a shaft bearing at the base of the U. Tension blades are rivetted to the stator ring to position a pair of shell permanent magnets. A brush plate is retained by housing lugs adjacent the commutator.

Background of the invention

In conventional machines of the preceding species, the housing of the machine is secured to the magnetic structure through bolts, soldered connections, or similar such fastening means. Arrangements are also known in which the wall section of the housing is secured to the magnetic structure through welding or clamping devices using axial projections on the magnetic structure. These commonly known designs are generally quite expensive or, in the case of fastening through clamping means, are applicable only for miniaturized machines as, for example, toy motors. In the latter it is adequate to provide relatively thin-walled structural elements.

It is an object of the present invention to provide machines of the foregoing species with an arrangement whereby the housing may be mounted to the magnetic structure in a simple manner. It is also the object of the present invention to provide that the housing may be centered with respect to the magnetic structure in a very precise manner and is adapted to assembly line type of production.

For purposes of achieving these objects, it is provided, in accordance with the present invention, that the height of the projections at the magnetic structure in the direction of the axis of the machine, be larger than the thickness of the wall section of the housing in the same direction of the axis. The present invention further provides that retaining lugs be chiseled along the transition from the projections to shoulder surfaces. These retaining lugs grip across the shoulder surfaces and into the rim of the housing to be mounted.

In accordance with the design of the present invention, no auxiliary parts are required for securing the housing and the arrangement requires that only one machining operation be executed. The design is such that a second housing portion on the other side of the magnetiic structure may also be secured at the same time.

It is of particular advantage when the machines under consideration have a magnetic structure with a ring shaped ferromagnetic member serving as the return path for the magnetic flux. This ferromagnetic member provides the housing with only a relatively small contact surface. In accordance with the present invention, the terminal edge or rim of the ferromagnetic member is provided with notch-shaped recesses. The planar wall sections of the housings rest on the base surfaces of the notch-shaped recesses. The edges of these notch-shaped recesses serve as shoulder surfaces for centering the housing and securing to the magnetic structure through axial projections thereof.

In a further development and design of the present invention, retaining lugs are provided on the axial projections through being shaped by a chisel. The cut of the chisel is made parallel to the edge or intersection of the terminal surface and the shoulder surface. The cut is, furthermore, double-wedge-shaped so that the distance of the edges or intersections of the terminal surface and the shoulder surfaces increases towards the axis of the machine. The planar wall section of the housing becomes pressed against contact surfaces of the magnetic structure as a result of the preceding cutting operation.

In accordance with the present invention a very precise location of the housing is achieved with respect to the magnetic structure. In machines having ring-shaped ferromagnetic members serving as the return path for the magnetic flux, it is of advantage when the contact surfaces of the magnetic structure are formed with the inner wall of the ferromagnetic member. In this manner, the planar wall sections of the housing rest against the contact surfaces for centering and mating purposes.

The design of the present invention also permits the securing of the brushes to a carrying plate in the housing, in a particular advantageous manner. This is accomplished by also chiseling a groove so as to center the carrying plate edge and connecting it with that of the housing.

Summary of the invention

An electrical machine is provided having a magnetic structure or stator and a rotor. Housing sections which are to be applied for housing the machine are provided with planar wall sections extending radially outward and resting upon the frontal side of the stator. The planar wall section extends between shoulder surfaces on axial projections of the stator for purposes of centrally locating and securing the housing section. The height of the projections on the stator is made larger than the thickness of the planar wall section, when taken in the direction of the axis of the motor. The projections have at least one retaining lug between the frontal side of the stator and the shoulder surfaces. The lug is chiseled from the frontal side of the stator and formed from a groove-shaped cut so as to extend beyond the rim of the housing section resting against the shoulder surfaces.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Brief description of the drawing

FIG. 1 is a cross-sectional elevational view through the axis of the electrical machine in accordance with the present invention;

FIG. 2 is an end view of the machine of FIG. 1 taken in the direction of arrow;

FIG. 3 is an end view of the housing section associated with the commutator side of the electrical machine of FIG. 1;

FIGS. 4 and 4a are enlarged portions of the end view of FIG. 2;

FIGS. 5 and 5a are plan views of the enlarged portions of FIGS. 4 and 4a.

*Description of the preferred embodiment*

Referring to the drawing, the motor has a magnetic structure comprised of two shell-formed permanent magnetic members 11 and 12. A ring-shaped ferromagnetic member 13 serves as the return path for the magnetic flux. The magnetic members 11 and 12 lie against the inner wall of the member 13, and are secured in place through tension blades 15 and 16. The tension blades 15 and 16 are rivetted to member 13 with the aid of lugs provided on the member 13 and projecting through holes in the tension blades.

Between the magnetic members 11 and 12, is an armature 20 secured to a shaft 22. A commutator 21 is also mounted onto the shaft 22. The shaft is rotatably held within bearings 23 and 24 seated in retaining housings 25 and 26, respectively. Each of the housing portions 25 and 26 are of U-shaped contour and mounted so that their arms terminate at the ferromagnetic member 13, while the bearings are retained at the cross-portions. A carrying plate 27 is located at the frame or housing section 25 for the purpose of securing in place brushes for the commutator 21. The brushes are not shown in the drawing for purposes of maintaining the latter in simple form.

The arms of the housing sections 25 and 26 terminate at their edges in bent-over rims to form planar wall sections 30 which lie perpendicular to the plane of the motor axis. The wall sections 30 are bordered by surfaces 31 running radial to the motor axis and by the cylindrical surfaces 32. The diameter of the cylindrical external surfaces 32 corresponds to the external diameter of the ferromagnetic member 13. Both rims of the ferromagnetic member 13 have notch-shaped recesses 33 which have the shape and angular relationship of the wall sections 30. The recesses 33 are bordered on the sides by the shoulder surfaces 34. The wall sections 30 of the housing pass in a gripping fashion through these shoulder surfaces 34. The wall sections 30 rest upon the base surfaces 35 of the recesses 33. For purposes of centering with respect to the magnetic structure, the housing sections have cylindrical locating or mating surfaces 36. These locating surfaces 36 lie between the wall sections 30 and have a diameter which corresponds to the inner diameter of the ferromagnetic member 13. When the housing portions are mounted upon the magnetic structure, the locating surfaces 36 lie tightly without play against the inner wall 37 of the ferromagnetic member 13.

The depth of the recesses 33 in the direction of the motor axis is larger than the thickness of the planar wall section 30 of the housing portions 25 and 26. The remaining rim sections 40 between the recesses 33 of the ferromagnetic member 13 have a retaining lug 42 along the path from the edge 41 to the shoulder surfaces 34. These retaining lugs 42 lie against the shoulder surfaces 34 and grip over the side rims of the housing portions to secure them in place. The retaining lugs 42 are formed by means of a chisel cutting into the edge 41 and leaving a wedge-shaped cut. FIGS. 4 and 5 of the drawing show only the retaining lug 42 at the left recess 33. The recess 33 to the right in the drawing, shows the construction prior to performing the chiseling operation for forming the lug.

To form the retaining lug 42 the cutting edge of the chisel is located parallel to the edge 43 formed as the intersection of the shoulder surface 34 and terminal surface 41. The cut is made so that the wedge-shaped angle $\alpha$ becomes increasingly larger towards the motor axis. The width of the chiseled groove 44 becomes thereby larger towards the motor axis so that an angle $\beta$ is formed at the transition of the terminal surface 41 to the groove 44, as shown in FIG. 4. Through this chiseling operation a force component is also exerted upon the wall section 30 in a radial direction. As a result, the locating surfaces 36 bear tightly against the inner wall 37 of the ferromagnetic member 13 and provide for an accurate centering of the housing portions.

The carrying plate 27 for carrying the brushes of the motor is secured to the housing portion 25 by means of the retaining lugs 50. These retaining lugs 50 are also formed through chiseling and serve to center the carrying plate about the rim surface of the housing portion 25.

It will be understood that each of the elements described above, or two or more together, may also find a useful application in other types of miniaturized electrical machine differing from the types described above.

While the invention has been illustrated and described as embodied in miniaturized electrical machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. An electrical machine comprising, in combination, magnetic stator means; rotor means; and at least one housing section having at least one planar wall section extending radially outward and resting upon the frontal side of said stator means, said planar wall section extending between shoulder surfaces on axial projections of said stator means for centrally locating and securing said housing section, the height of said projections on said stator means being larger than the thickness of said planar wall section in the direction of the axis of said rotor means, said projections having at least one retaining lug between said frontal side and said shoulder surfaces, said lug being chiseled from said frontal side and formed from a groove-shaped cut so as to extend beyond the rim of said housing section resting against said shoulder surfaces.

2. The electrical machine as defined in claim 1, wherein said magnetic stator means includes a ring-shaped ferromagnetic member providing the magnetic return path for the magnetic flux through said stator means and having notch-shaped recesses on the frontal rim of said ferromagnetic member, said planar wall section resting upon the base surfaces of said notch-shaped recesses, the edges of said notch-shaped recesses forming said shoulder surfaces on axial projections of said stator means.

3. The electrical machine as defined in claim 1, wherein said groove-shaped cut is parallel to the edge formed by the intersection of said frontal side and said shoulder surfaces, the width of said cut increases from one end of the cut to its other end, said planar wall section of said housing section being pressed against bearing surfaces of said magnetic stator means by said cut.

4. The electrical machine as defined in claim 3, wherein said bearing surfaces on said magnetic stator means are on the inner wall of said ferromagnetic member, said housing section having mating surfaces resting against said bearing surfaces.

5. The electrical machine as defined in claim 4, wherein said housing section has a U-shaped contour containing a bearing at its base, the ends of said U being bent outward and carrying said planar wall section secured to said ferromagnetic member.

6. The electrical machine as defined in claim 5, including permanent magnetic means and clamping blades for securing said permanent magnetic means to the inner wall of said ferromagnetic member, said clamping plates being riveted to the ferromagnetic member with the aid of lugs provided on this member and projecting through holes in the clamping plates.

7. The electrical machine as defined in claim 1 including commutator means, and a supporting plate for supporting brush means in contact with said commutator means, said supporting plate being joined to said housing section through a cut chiseled from said housing section at the rim edge for centering said supporting plate.

References Cited

UNITED STATES PATENTS

| 2,464,017 | 3/1949 | Berghorn | 310—254 |
| 2,513,227 | 6/1950 | Wylie | 310—154 |
| 2,701,318 | 2/1955 | Feiertag | 310—258 |
| 3,026,432 | 3/1962 | Baumhart | 310—239 |
| 3,061,746 | 10/1962 | Hansen | 310—90 |
| 3,313,968 | 4/1967 | Kaiser | 310—258 |

WARREN E. RAY, Primary Examiner.

U.S. Cl. X.R

310—89, 154, 239, 254